United States Patent [19]

Sydlowski et al.

[11] Patent Number: 4,527,449

[45] Date of Patent: Jul. 9, 1985

[54] BORING BIT AND METHOD FOR MANUFACTURE THEREOF

[75] Inventors: William E. Sydlowski, Wakefield, Mass.; Harold A. Trent, San Leandro, Calif.

[73] Assignee: Rule Industries, Inc., Gloucester, Mass.

[21] Appl. No.: 416,850

[22] Filed: Sep. 13, 1982

[51] Int. Cl.³ .......................... B21K 5/02; B23B 51/00
[52] U.S. Cl. ........................................ 76/108 R; 408/16;
                                                     408/225; 408/226
[58] Field of Search ............ 408/223, 226, 202, 241 S,
           408/144, 16, 211, 241 R, 212, 213, 214, 225;
           33/334, 185 R, 169 R; 81/DIG. 5; 145/116 R;
           175/40; 76/108 R, 108 T, 108 A; 125/40

[56] References Cited

U.S. PATENT DOCUMENTS

| 509,667 | 12/1893 | Lavigne | 408/212 |
| 1,984,839 | 12/1934 | Murray | 408/226 |
| 2,782,824 | 2/1957 | Robinson | 408/226 X |
| 2,886,291 | 5/1959 | Frisby | 175/40 |

FOREIGN PATENT DOCUMENTS

| 597087 | 11/1925 | France | 408/226 |
| 55592 | 4/1911 | Switzerland | 145/116 R |
| 443 | of 1893 | United Kingdom | 175/40 |
| 112040 | 12/1917 | United Kingdom | 175/40 |

*Primary Examiner*—William R. Briggs

[57] ABSTRACT

There are disclosed herein power tool boring bits having boring depth indicating markings on the shanks thereof. The markings are produced by colored oxiding of substantially the entire shank of the tool followed by selective abrasion of the shank to remove bands of substantially only the thin surface oxide in alternate array with bands of the colored oxide.

12 Claims, 3 Drawing Figures

4,527,449

BORING BIT AND METHOD FOR MANUFACTURE THEREOF

FIELD OF THE INVENTION AND PRIOR ART

The present invention relates broadly to boring bits and is more particularly concerned with boring bits for power tools.

In the art of woodworking and general construction work there often exists a need to bore holes of preselected diameters into or through workpieces. Various rotary tools have been devised to accomplish this task such as twist and fluted drills, screw augers, rotary rasps, burrs and the like. Of relatively recent vintage there have been developed boring bits, generally termed "spade bits", which are specifically adapted for use in conjunction with power drills. The general spade bit construction comprises a tool shank, one end of which shank is adapted for reception in the chuck of a power drill and the other end of which shank comprises or has affixed thereto a cutting member in the nature of a vane extending outwardly beyond the circumference of the shank. The bottom edge of the vane is ground to a cutting edge, the rotational center of said bottom edge having a suitably conformed pilot depending therefrom. Such spade bit constructions have found a very considerable marketplace since they are effective in operation, relatively inexpensive, relatively easy to resharpen and are susceptible of relatively high speed boring operations.

It is often desirable that a boring bit be provided with means by which the depth of the hole bored therewith may be readily determined during boring opertions. For instance, in Swiss Pat. No. 55, 592, to Heinrich Hausli, there is disclosed a hand tool screw auger having boring depth markings on the shank portion thereof, said markings having been produced by a metal upsetting or removing technique such as by stamping, engraving or embossing of said shank portion. However, when depth indicating marking constructions similar to those disclosed in this patent are applied to power tool boring bits, there arise certain serious deficiencies. Specifically, the application of depth indicating markings to the shank of a power tool bit by a metal removal or upsetting technique inherently results in the formation of stress concentrations within the metal of the shank. Thus, at the relatively high speed operations of power tool bits, particularly spade bits, the bit can momentarily engage an obstruction in the workpiece, such as an undetected nail or knot, and set up destructive loads in the tool shank at the stress concentration locations thereof. Thus, circumferential engravings or other depth indicating markings involving upsetting or removal of metal from the shank of a power tool boring bit can contribute to premature and catastrophic failure of the bit during operaions. Too, the relatively narrow and non-contrasting depth indicating markings disclosed in the aforementioned Swiss Patent are of a type which are readily observable substantially only when the bit is at rest, such as when the operator periodically stops boring work and inspects the static bit for its depth of pentration in the workpiece. Such markings are not useful in the case of power tool boring bits wherein the rotational and boring speeds of the bit are relatively high. The relatively thin non-contrasting engraved or stamped markings disclosed in the Swiss Patent tend to become relatively indistinguishable at high rotational bit speeds and are essentially useless to the operator of a power tool unless the tool is operated in short boring sequences and is periodically stopped simply for purposes of observing the depth indicating markings of the bit in a manner similar to that of a hand boring operation. Obviously, however, the application of such hand tool boring techniques to the operations of power operated boring tools results in considerable inefficiencies. Moreover, in view of the relatively high boring rates usually realized during power tool operations, there continues to exist the danger of accidental overruns, In accordance with the present invention, however, the above problems are substantially fully overcome.

It is a principal object of the invention to provide a novel power tool boring bit construction.

It is still another object of the invention to provide an improved power tool boring bit construction having boring depth markings on the shank thereof wherein the strength of the shank remains essentially uncompromised.

It is yet another object of the invention to provide an improved power tool boring bit construction having boring depth markings on the shank thereof, which markings remain readily observable during operations.

It is still another object of the invention to provide a novel method for applying depth indicating markings to the shank of a power tool boring bit whereby the strength of said shank remains essentially uncompromised and the resulting markings remain readily observable during boring operations.

Other objects and advantages of the present invention will, in part, be obvious and will, in part, appear hereinafter.

SUMMARY OF THE INVENTION

In accordance with the invention, the shank of a power tool boring bit is substantially uniformly colored by any suitable thin surface oxiding technique. Selected portions of substantially only the thin colored surface oxidation are abraded away from the circumference of the shank to expose bands of bare shank metal which alternate in spaced array with bands of the colored surface oxidized metal along the length of the shank.

DESCRIPTION OF PREFERRED EMBODIMENTS

Figure 1:
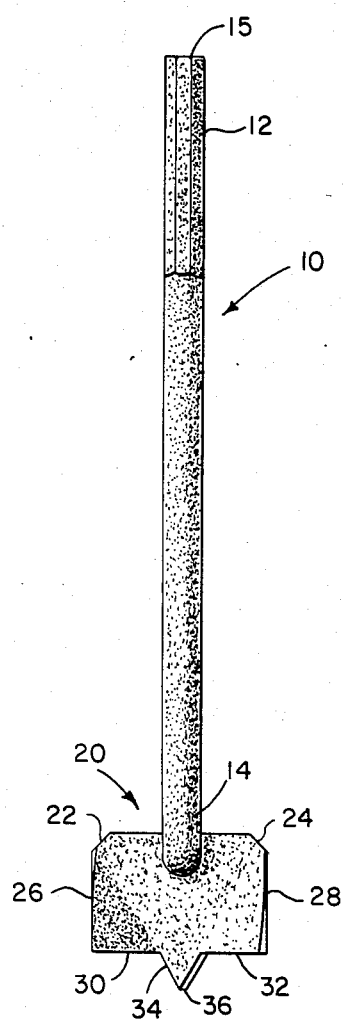
FIG. 1 hereof is a diagrammatic, schematic, frontal vview of a boring bit in accordance with the invention after coloring of the shank by this surface oxiding thereof.

Referring now to the drawing, wherein like reference numerals refer to like structures, the preferred boring bit of the invention broadly comprises a shank 10 having a free end portion 12 adapted for reception thereof in the chuck of a power drill and a tool end portion 14 to which there is affixed a cutting vane 20. Vane 20 comprises a pair of cutting wings 22 and 24, respectively, which wings extend equidistantly beyond the circircumference of the shank 10. The bottoms 30 and 32 of the cutting wings 22 and 24 are each ground to a cutting edge while the side edges 26 and 28 may be ground to present side cutting leading edges, each of said cutting edges being positioned forwardly relative to the rotational direction of the bit. Preferably, the side edges 26 and 28 of vane 20 are arcuately ground to the radii of the wings 22 and 24. In addition, it is also desirable that the side edges 26 and 28 not be precisely parallel to the axis of rotaion of the bit. Rather, it is preferred that said edges 26 and 28 be provided with equal, but slight, negative relief angles extending upwardly in the genral direction of the free end portion 12 of shank 10. Accordingly, by provision of these preferred relief angles the diameter of vane 20 taken across the upper portions of side edges 26 and 28 will be a few thousandths of an inch smaller than the diameter taken across the bottoms 30 and 32 thereof. These side edge 26 and 28 features serve to provide a bit possessed of substantial anti-binding and anti-galling properties. Normally, the direction of rotation of the bit will be clockwise when viewed from the free end portion 12 of the shank. Accordingly, in FIGS. 1 and 2 hereof the leading cutting edge of bottom 32 of wing 24 will generally be toward the viewer while the cutting edge of bottom 30 of wing 22 will generally be away from the viewer. Disposed on the axis of rotation of the vane 20 and depending from the meeting point of bottoms 30 and 32 is a pilot 34 which comes to a sharp point at the free end 36 thereof.

In accordance with the invention, the surface of substantially the entire length of shank 10 is uniformly colored by any suitable thin surface oxiding technique in which the colored oxide layer produced is no more than about 0.001 inch in thickness and is preferably no more than about 0.0005 inch in thickness. It will be recognized that it is obviously not essential that the free end portion 12 of shank 10 be oxided for purposes of providing the depth indicator markings of the invention, although it is normally desirable to do so as a matter of convenient processing. For instance, the colored oxiding of the shank 10 can be achieved by chemical blueing or browning, by black oxiding, by air or steam quenching of the steel during hardening, by phosphating, by oil blackening and the like. The particular oxiding technique selected will ordinarily depend upon such considerations as the composition of the metal employed for the shank 10 and the specific forming and hardening operations required to be undertaken in the manufacture of the particular boring bit ware to be treated in accordance with the invention. For instance, in the case of tool steel boring bit constructions, we generally find it conventient to combine the thin colored oxiding of the shank 10 with hardening thereof, the latter of which is conventionally a necessary operation during the manufacture of such tool steel boring bits. Thus, for tool steel boring bits it is preferred that the colored oxiding of the shank 10 be produced by steam quenching of the shank 10 during hardening thereof. The resulting coloration produced by steam quenching of tool steel wares is generally of a desirable dark uniform hue and usually is of a thickness of only a few ten thousandths of an inch.

Having thus produced a thin colored surface oxidation of the shank 10, selected spaced apart bands thereof are removed from the circumference of the shank by any suitable abrasion technique adapted to remove substantially only the thin surface oxide, thereby to expose the bright shank metal lying thereunder. Several such suitable abrasion techniques will be apparent to those of skill in the art. For instance, those portions of the shank 10 selected to remain surface colored can be suitably masked with an elastic abrasion resistant material, for example, by means of rubber bands of selected widths disposed at suitably spaced locations over the length of the shank 10. The thusly masked ware can then be placed in a fluidized abrasion zone composed of abradant particles, such as silicon carbide or emery grit, and maintained in said fluidized abrasion zone for such time as to result in the removal of substantially only the colored surface oxide from the exposed portions of the shank 10. Alternatively, the masked shank 10 can be exposed to a forceful blast of abrasive particles with similar result.

In the case of boring bit shanks of circular cross section, it is preferred that the bands of colored thin surface oxide be selectively abraded away by centerless grinding of the shank 10. Referring now to FIG. 3 hereof, there is shown a centerless grinder 40 comprising a fixed table 42, an adjustable tool stop 44 adapted to receive the end 15 (FIG. 1) of shank 10 thereagainst in abutting relationship, a work rest blade 46 adapted to receive and support the shank 10 thereon, a plurality of grinding wheels 48 journalled on a common axis of rotation parallel to the work rest blade 46 and a regulating wheel 50 (shown in phantom) disposed at a spaced distance from said grinding wheels 48 and on a parallel axis of rotation thereto. The regulating wheel is provided with means (not shown) whereby the space between itself and the grinding wheels 48 may be opened and closed, with the space defined by the closed position thereof being precisely adjustable. Such means are well known and conventional in the centerless grinding art and require no further elaboration here. The width of each grinding wheel 48 is selected to produce the desired width of each corresponding bright metal band on the surface of shank 10. Additionally, spacers 49 are disposed between the wheels 48, the width of each said spacer 49 being selected to result in the desired width of each corresponding colored oxide band to be produced on the surface of shank 10. Grinding fluid may be brought to the working surface of each grinding wheel 48 and/or to the shank 10 by means of an overhead manifold 60 having appropriately positioned drip tubes 62 depending therefrom. In operations, the regulating wheel 50 is brought to the open condition and the shank 10 of the boring bit rested on the work rest blade 46 with the free end 15 (FIG. 1) butted against the tool stop 44. Tool stop 44 is adjusted longitudinally with respect to the work rest blade 46 so as to position shank 10 to receive the colored oxide bands 13 thereon (defined by the spaces between grinding wheels 48) at precise distances from the datum plane defined by the bottoms 30 and 32 of cutting vane 20. With the grinding wheels 48 and regulating wheel 50 in operation, the regulating wheel 50 is then urged to the closed position, thereby causing the shank 10 to be rotated and the colored oxide surface thereof to be biased against the surfaces of the spaced apart grinding wheels 50. By appropriate control of the closed position spacing between the regulating wheel 50 and the grinding wheels 48, substantially only the colored surface oxide of the shank 10 is selectively ground away, exposing the bright shank metal thereunder, thereby resulting in essentially no removal or upsetting of the shank metal and avoiding generation of consequential stress concentrations therewithin. Upon completion of the centerless grinding step the regulating wheel 50 is brought to the open position and the finished ware removed from the work rest blade 46. Using the particular centerless grinding arrangement depicted in FIG. 3 hereof, the resulting shank 10 obtains the appearance shown in FIG. 2 comprising a plurality of spaced apart relatively broad circumferential bright metal bands 11 of equal widths alternating with a plurality of spaced apart, relatively narrow bands 13 of equal widths of the colored oxide.

Figure 2:
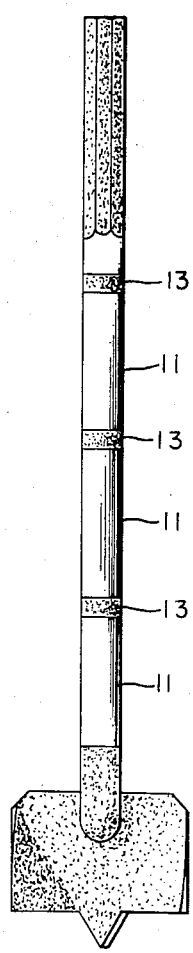
FIG. 2 hereof is a diagrammatic, schematic, frontal view of the boring bit of FIG. 1 after selective abrading of the thin colored oxide of the shank in accordance with the invention.
Figure 3:
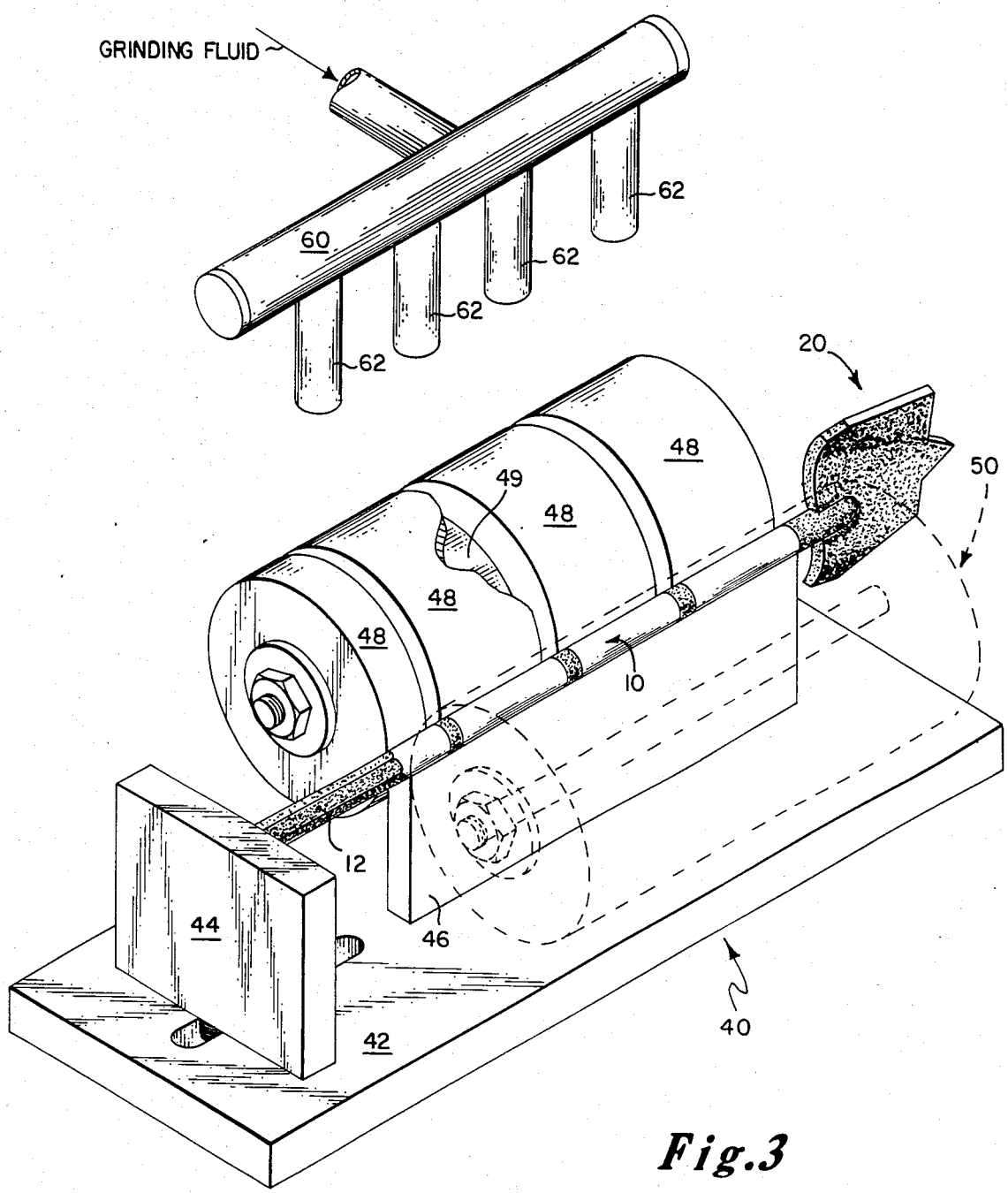
FIG. 3 hereof is a diagrammatic, schematic, perspective, partially sectional and partially phantom view of a portion of a centerless grinding arrangement by which the selective abrading operation of the invention can be conveniently performed upon boring bits having shanks of circular cross section.

The particular array and sizing of the alternating bright metal and colored oxide bands 11 and 13 shown in FIG. 2, wherein said relatively narrow colored oxide bands 13 are equally spaced along the length of the shank 10 by the relatively broad bright metal bands 11, has been found to constitute a readily observable boring depth marking scheme during high speed boring operations and thus comprises a preferred depth marking arrangement of the invention. Obviously, however, by suitable alterations and selections in the widths of grinding wheels 48 and spacers 49 in the centerless grinding arrangement, many different usable formats of the finished alternating colored oxide and bright metal bands can be produced without departing from the spirit and scope of the invention.

What is claimed is:

1. In a boring bit for power drills comprising a metal shank having a free end adapted for reception in the chuck of a power drill and the other end of which shank comprises bore cutting means, the improvement which comprises an array of bore depth indicator markings along the length of said shank, said array comprising a plurality of spaced apart bands of a thin colored oxide of the shank metal alternating with spaced apart bands of bright shank metal, said thin colored oxide and bright metal bands being performed by thinly and colorably oxiding substantially the entire shank and then selectively removing spaced apart bands of substantially only said thin colored oxide to expose corresponding bands of bright shank metal thereunder.

2. The boring bit of claim 1 wherein said bore cutting means is a cutting vane comprising a pair of cutting wings extending outwardly beyond the circumference of said shank, each said wing having a bottom cutting edge, and a pilot depending from the rotational center of said bottom cutting edges.

3. The boring bit of claim 2 wherein said bottom edges define a datum plane from which said alternating bands of said array are spaced.

4. The boring bit of claim 1 wherein said bands of bright shank metal are of equal and relatively broad widths and said bands of colored metal oxide are of equal and relatively narrow widths.

5. The boring bit of claim 1 wherein the thickness of said thin colored oxide is no greater than about 0.0005 inch.

6. The boring bit of claim 2 wherein each said cutting wing has a side edge, said side edge being arcuately ground to the radius of its associated wing.

7. The boring bit of claim 6 wherein said side edges are provided with equal, but slight, negative relief angles extending upwardly from said bottom cutting edges.

8. A method for providing the shank of a boring bit for power drills with bore depth indicator markings which comprises colorably and thinly oxiding substantially the entire shank of the bit and selectively abrading spaced apart bands of substantially only said thin colored oxide therefrom, thereby to expose corresponding bands of bright shank metal thereunder in alternate array with spaced apart bands of said thin colored oxide.

9. The method of claim 8 wherein said oxiding of the shank is undertaken to a thickness of no greater than about 0.0005 inch.

10. The method of claim 8 wherein said shank is composed of steel and said oxiding is undertaken as a part of heat treatment thereof.

11. The method of claim 10 wherein said oxiding is accomplished by steam quenching.

12. The method of claim 8 wherein said shank is of circular cross section and said abrading of bands of thin colored oxide therefrom is accomplished by centerless grinding.

* * * * *